United States Patent
Guim Bernat et al.

(10) Patent No.: US 10,389,839 B2
(45) Date of Patent: Aug. 20, 2019

(54) METHOD AND APPARATUS FOR GENERATING DATA PREFETCHES SPECIFYING VARIOUS SIZES TO PREFETCH DATA FROM A REMOTE COMPUTING NODE

(71) Applicant: Intel Corporation, Santa Clara, CA (US)

(72) Inventors: Francesc Guim Bernat, Barcelona (ES); Karthik Kumar, Chandler, AZ (US); Thomas Willhalm, Sandhausen (DE); Raj K. Ramanujan, Federal Way, WA (US); Brian J. Slechta, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 168 days.

(21) Appl. No.: 15/170,094

(22) Filed: Jun. 1, 2016

(65) Prior Publication Data

US 2017/0353576 A1   Dec. 7, 2017

(51) Int. Cl.
*H04L 29/08* (2006.01)
*G06F 12/0862* (2016.01)

(52) U.S. Cl.
CPC ...... *H04L 67/2847* (2013.01); *G06F 12/0862* (2013.01); *G06F 2212/154* (2013.01); *G06F 2212/602* (2013.01); *G06F 2212/6022* (2013.01)

(58) Field of Classification Search
CPC ............. H04L 67/2847; G06F 12/0862; G06F 2212/602; G06F 2212/6022
See application file for complete search history.

(56) References Cited

U.S. PATENT DOCUMENTS

| 6,754,779 B1* | 6/2004 | Magro | G06F 12/0862 710/22 |
| 7,873,791 B1* | 1/2011 | Yu | G06F 12/0862 711/137 |
| 9,058,283 B2* | 6/2015 | Ryan | G06F 12/0862 |
| 2001/0049769 A1* | 12/2001 | Ono | G06F 12/0806 711/118 |
| 2004/0064648 A1* | 4/2004 | Brown | G06F 12/0862 711/137 |
| 2006/0031640 A1* | 2/2006 | Henry | G06F 12/0802 711/126 |

(Continued)

OTHER PUBLICATIONS

International Search Report and Written Opinion in International Application No. PCT/US2017/034894 dated Aug. 24, 2017, 11 pages.

(Continued)

*Primary Examiner* — Mohamed A. Wasel
(74) *Attorney, Agent, or Firm* — Alliance IP, LLC

(57) ABSTRACT

An apparatus comprises a processor to generate, in anticipation of receipt of a read request for data of a data set, a prefetch request to retrieve the data set from a memory device, the prefetch request to comprise at least one parameter indicating a size of the data set. The processor is further to cause transmission of the prefetch request to the memory device and in response to a read request for at least a portion of the data set, request the at least a portion of the data set from a cache storing a copy of the data set, wherein the cache is to store the copy of the data set after the copy is received from the memory device in response to the prefetch request.

22 Claims, 6 Drawing Sheets

(56) References Cited

U.S. PATENT DOCUMENTS

| | | | |
|---|---|---|---|
| 2008/0104328 A1 | 5/2008 | Yoshikawa et al. | |
| 2009/0222453 A1 | 9/2009 | Naineni | |
| 2010/0169549 A1* | 7/2010 | Yano | G06F 12/0862 |
| | | | 711/103 |
| 2011/0173396 A1 | 7/2011 | Sugumar et al. | |
| 2011/0238922 A1* | 9/2011 | Hooker | G06F 12/0862 |
| | | | 711/137 |
| 2012/0166694 A1* | 6/2012 | Dosh | G06F 13/4234 |
| | | | 710/110 |
| 2013/0103783 A1 | 4/2013 | Mannava et al. | |
| 2013/0185517 A1* | 7/2013 | Elboim | G06F 12/0862 |
| | | | 711/137 |
| 2013/0282972 A1* | 10/2013 | Nazm Bojnordi | G06F 3/0611 |
| | | | 711/105 |
| 2015/0089156 A1* | 3/2015 | Clohset | G06T 1/60 |
| | | | 711/141 |
| 2015/0271287 A1 | 9/2015 | Islam et al. | |
| 2017/0083337 A1* | 3/2017 | Burger | G06F 9/3004 |
| 2017/0153892 A1* | 6/2017 | Linsky | G06F 9/30029 |
| 2017/0280434 A1* | 9/2017 | Begeja | H04L 65/4076 |

OTHER PUBLICATIONS

Birrittella et al., "Intel Omni-Path Architecture—Enabling Scalable, High Performance Fabrics", IEEE 2015; 9 pages.
Intel Corporation, "An Introduction to the Intel QuickPath Interconnect", Jan. 2009, 22 pages.

* cited by examiner

METHOD AND APPARATUS FOR GENERATING DATA PREFETCHES SPECIFYING VARIOUS SIZES TO PREFETCH DATA FROM A REMOTE COMPUTING NODE

FIELD

The present disclosure relates in general to the field of computer development, and more specifically, to remote prefetches of variable size.

BACKGROUND

A computing node may include one or more processors coupled to one or more memory devices. A computing node may also be coupled to one or more other computing nodes via a network fabric. When a computing node performs in-memory computing, the memory devices of one or more computing nodes may be shared among the processors of the nodes, enabling vast improvements in computing performance.

BRIEF DESCRIPTION OF THE DRAWINGS

Like reference numbers and designations in the various drawings indicate like elements.

DETAILED DESCRIPTION

Although the drawings depict particular computer systems, the concepts of various embodiments are applicable to any suitable integrated circuits and other logic devices. Examples of devices in which teachings of the present disclosure may be used include desktop computer systems, server computer systems, mainframe computer systems, storage systems, handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications may include a microcontroller, a digital signal processor (DSP), a system on a chip, network computers (NetPC), set-top boxes, network hubs, wide area network (WAN) switches, or any other system that can perform the functions and operations taught below.

Figure 1:
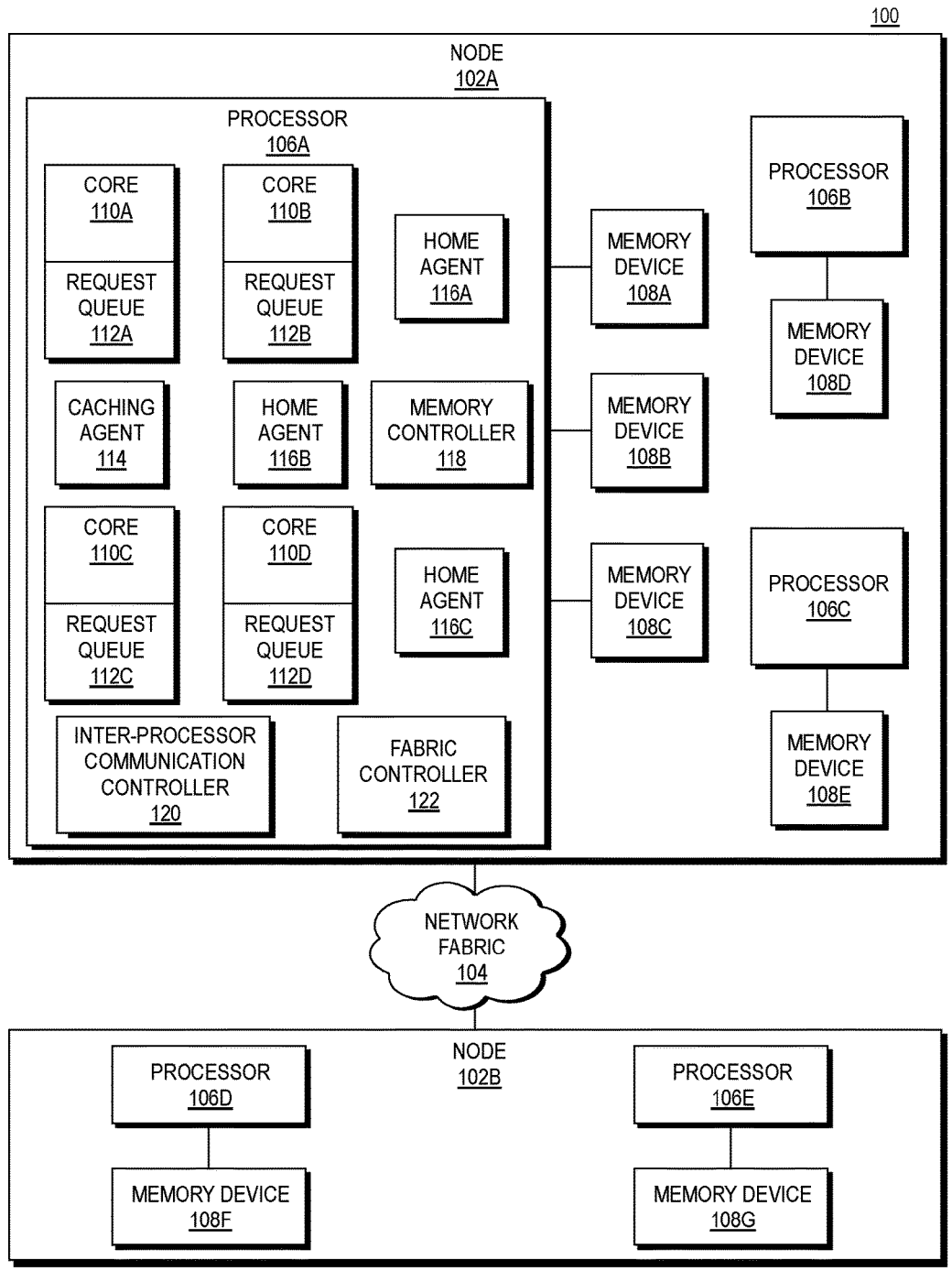
FIG. 1 illustrates a block diagram of components of a computer system in accordance with certain embodiments.

FIG. 1 illustrates a block diagram of components of a computer system 100 in accordance with certain embodiments. System 100 may include any suitable number of computing nodes 102 coupled to each other via a network fabric 104. A node 102 may include any suitable number of processors 106 and memory devices 108. System 100 may represent any suitable computing environment, such as a high performance computing environment, a datacenter, a communications service provider infrastructure (e.g., one or more portions of an Evolved Packet Core), an in-memory computing environment, other computing environment, or combination thereof.

During operation, data may be transferred between processors 106 and memory devices 108. In various embodiments, any suitable number of memory devices 108 of computer system 100 may be accessible by a processor (e.g., processor 106A). In various embodiments, a processor 106 may directly access memory devices that are coupled to the processor (e.g., processor 106A may access memory devices 108A-108C) and may indirectly access other memory devices by communicating with processors that are directly coupled to such memory devices (e.g., processor 106A may access memory device 108D through processor 106B, memory device 108E through processor 106C, memory device 108F through 106D, and memory device 108G through processor 106E). The latency associated with a data transfer between a particular processor 106 and a particular memory device 108 may be heavily dependent on the proximity of the memory device to the processor. In general, data transfers occurring within the same computing node 102 may be much faster than inter-node data transfers that have to traverse network fabric 104. For example, data read operations performed by processor 106A from memory devices 108A-108E may have much lower latencies than data read operations from memory devices 108F and 108G due to the time required to pass data through network fabric 104 and potential resource congestion at node 102B which may be serving other requests. In systems where inter-node accesses are relatively frequent (e.g., in in-memory computing), these latencies may bottleneck system performance.

Herein, with respect to a particular processor (e.g., processor 106A) a remote memory device 108 may refer to any memory device for which a relatively substantial latency is expected to be incurred for data reads from the memory device while a local memory device may refer to a memory device for which a relatively insubstantial latency is expected to be incurred for data reads from the memory device. As one example, memory devices 108F and 108G may be considered remote memory devices with respect to processors 106A-106C while memory devices 108A-108E may be considered local memory devices with respect to processors 106A-106C. In another example, memory devices 108D and 108E might be considered remote memory devices to processor 106A if the interconnect between processor 106A and memory devices 108D and 108E caused substantial delays for read operations.

In order to mitigate the effects of latency associated with reads from remote memory devices, the requesting processor (e.g., 102A) may perform a prefetch operation in which data that is expected to be used by the processor in the future is prefetched from the remote memory device (e.g., 108F). Prefetched data may be stored in proximity (e.g., in a cache of the processor 106A or node 102A) to the requesting processor such that it may be provided relatively quickly to a core or other processing element of the processor executing an instruction that requires the data. Although prefetch operations are generally performed with respect to remote memory devices, in various embodiments prefetch operations could be performed on local memory devices as well (e.g., memory devices 108 residing on the same computing node 102 as the requesting processor).

In various embodiments, a prefetch operation specifying a variable size of prefetch data is available to be called by a software application executing on node 102 or by hardware located within a processor 106 or node 102. The entity that initiates the prefetch operation may specify the size of the data that is to be prefetched. Such embodiments may offer various technical advantages (such as increased speed and more efficient communication) over systems in which a prefetch operation is limited to a fixed size (e.g., a single wordline of a memory device 108). Systems in which a prefetch operation is limited to a fixed size may require multiple requests for the prefetch data to be sent to the remote memory device 108 (e.g., via the network fabric 104) and are particularly inefficient for reading large amounts of data from a remote memory.

Some embodiments may also provide a dedicated cache for storing prefetched data. Such embodiments may allow data stored by a remote memory device to be brought closer to a particular processor without polluting a local cache (e.g., a cache for one or more cores 110 or a cache of fabric controller 122).

Computer system 100 may include any suitable number of computing nodes 102 implementing any number of memory coherent domains. In a memory coherent domain, a memory address space is consistently maintained among a plurality of cores 110, processors 106, or nodes 102. In a particular embodiment, each node 102 of system 100 implements a coherent domain. In other embodiments, a coherent domain may be formed by a set of nodes 102 sharing the same address space (which for a given node may include all or a portion of the node's address space). Using the network fabric 104, a computing node 102 may expose some or all of its address region to other nodes (that may be implementing their own coherent domains). In various embodiments, a computing node 102 may implement more than one coherent domain and any number of the coherent domains may be accessible by processors 106 of other computing nodes. In various embodiments, a computing node 102 may comprise one or more sockets that each comprise a processor. In a particular embodiment, a computing node 102 may comprise a circuit board comprising sockets for each processor 106 of the node.

Processor 106 may comprise any suitable processor, such as a microprocessor, an embedded processor, a digital signal processor (DSP), a network processor, a handheld processor, an application processor, a co-processor, a system on a chip (SOC), or other device to execute code (i.e., software instructions). Processor 106, in the depicted embodiment, includes four processing elements (cores 110A-110D), which may include asymmetric processing elements or symmetric processing elements. However, a processor may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 110 may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

In various embodiments, the processing elements may each include or otherwise be associated with (e.g., coupled to) one or more request queues 112 that store memory requests generated by the respective processing element, such as read requests, write requests, prefetch requests, or other requests involving a memory device 108. For example, in the depicted embodiment, each core 110 is associated with its own request queue 112. In other embodiments, a request queue 112 could be shared by multiple processing elements.

In various embodiments, the request queues 112 may communicate with one or more caching agents 114 of a processor 106. A caching agent 114 may be associated with a one or more processing elements (e.g., cores 110) and may process memory requests from these processing elements (such requests may be received from the request queues 112). A caching agent 114 may also manage coherency between all of its associated processing elements. For example, a caching agent 114 may initiate transactions into coherent memory and may retain copies of data in its own cache structure. A caching agent 114 may also provide copies of coherent memory contents to other caching agents (e.g., of other processors 106).

In various embodiments, a caching agent 114 may receive a memory request and route the request towards an entity that facilitates performance of the request. For example, if caching agent 114 of processor 106A receives a memory request specifying a memory address of a memory device coupled to the processor (e.g., 108A, 108B, or 108C), the caching agent 114 may route the request to a home agent 116 that manages the particular memory device. As another example, if the memory request specifies a memory address of a memory device (e.g., memory device 108D or memory device 108E) that is on the same node 102A but connected to a different processor, the caching agent 114 may route the request to inter-processor communication controller 120 (which communicates with the other processors of the node). As yet another example, if the memory request specifies a memory address of a memory device (e.g., memory device 108F or 108G) that is located on a different node 102B, the caching agent 114 may route the request to fabric controller 122 (which communicates with the other nodes via network fabric 104).

In particular embodiments, the caching agent 114 may include a system address decoder that maps virtual memory addresses and/or physical memory addresses to entities associated with the memory addresses. For example, for a particular address (or region of addresses) the system address decoder may include an indication of the entity (e.g., memory device 108) that stores data at the particular address or an intermediate entity on the path to the entity that stores the data (e.g., a computing node 102, a processor 106, a home agent 116, inter-processor communication controller 120, fabric controller 122, or other entity). When a caching agent 114 processes a memory request, it may consult the system address decoder to determine where to send the memory request.

A home agent 116 is associated with one or more memory devices 108 and manages memory requests involving its associated memory devices. In the embodiment depicted, home agent 116A is associated with memory device 108A, home agent 116B is associated with memory device 108B, and home agent 116C is associated with memory device 108C. A home agent 116 is responsible for processing memory requests (e.g., received from a caching agent 114, inter-processor communication controller 120, or fabric controller 122) involving its associated memory device and acts as a home for part of a memory address space (one processor may have multiple homes in a distributed address space mapping). A home agent 116 may service coherent transactions, which may include handshaking with caching agents 114. A home agent 116 may supervise a portion of the coherent memory. As such, the home agent 116 may manage conflicts that arise among the different caching agents accessing the memory space assigned to the home agent. The home agent 116 may provide the appropriate data and ownership responses in accordance with a given transaction's flow.

A memory device 108 may store any suitable data, such as data used by processors 106 to provide the functionality of computer system 100. For example, data associated with programs that are executed or files accessed by cores 110 may be stored in memory device 108. Thus, a memory device 108 may include a system memory that stores data and/or sequences of instructions that are used or executed by the cores 110. In various embodiments, a memory device 108 may store persistent data (e.g., a user's files or instruction sequences) that remains stored even after power to the memory device 108 is removed. A memory device 108 may be dedicated to a particular processor 106 or shared with other devices (e.g., one or more other processors or other device) of computer system 100.

In various embodiments, a memory device 108 may include a memory comprising any number of memory modules, a memory device controller, and other supporting logic. A memory module may include a plurality of memory cells that are each operable to store one or more bits. The cells of a memory module may be arranged in any suitable fashion, such as in columns and rows or three dimensional structures. The cells may be logically grouped into banks, blocks, pages (wherein a page is a subset of a block), frames, wordlines, bytes, or other suitable groups.

A memory module may include non-volatile memory and/or volatile memory. Non-volatile memory is a storage medium that does not require power to maintain the state of data stored by the medium. Nonlimiting examples of non-volatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory. In some embodiments, 3D crosspoint memory may comprise a transistor-less stackable cross point architecture in which memory cells sit at the intersection of words lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org).

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of the memory modules complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org).

Memory device 108 may have any suitable form factor. In a particular embodiment, memory device 108 has a dual in-line memory module (DIMM) form factor. A DIMM may include multiple memory modules mounted on a circuit board that includes electrical contacts (i.e., pins) on each side of the circuit board. In various examples, the memory device 108 may have any suitable number of pins, such as 288, 260, 244, 240, 204, 200, or other suitable number of pins. In various embodiments, memory device 108 may be inserted into a DIMM slot on a circuit board (e.g., motherboard) that also comprises a socket for processor 106. In other embodiments, memory device 108 may have any other suitable form factor.

Memory devices 108 may comprise any suitable type of memory and are not limited to a particular speed or technology of memory in various embodiments. Memory devices 108 may include any suitable interface to communicate with a memory controller 118 or an I/O controller of a processor using any suitable communication protocol such as a DDR-based protocol, peripheral component interconnect (PCI), PCI Express (PCIe), Universal Serial Bus (USB), Serial Attached SCSI (SAS), Serial ATA (SATA), Fibre Channel (FC), System Management Bus (SMBus), or other suitable protocol. In particular embodiments, memory device 108 may comprise multiple communication interfaces that each communicate using a separate protocol with a memory controller 118 and/or I/O controller.

Memory controller 118 is an integrated memory controller (i.e., it is integrated on the same die or integrated circuit as processor 106A) that includes logic to control the flow of data going to and from the memory devices 108. Memory controller 118 may include logic operable to read from a memory device 108, write to a memory device 108, or to request other operations from a memory device 108. In various embodiments, memory controller 118 may receive write requests from cores 110 and may provide data specified in these requests to a memory device 108 for storage therein. Memory controller 118 may also read data from a memory device 108 and provide the read data to an I/O controller or a core 110. During operation, memory controller 118 may issue commands including one or more addresses (e.g., row and/or column addresses) of the memory device 108 in order to read data from or write data to memory (or to perform other operations). In some embodiments, memory controller 118 may be implemented in a different die or integrated circuit than that of processor 106A.

Inter-processor communication controller 120 provides an interface for inter-processor communication. Inter-processor communication controller 120 may couple to an interconnect that provides a transportation path between two or more processors. In various embodiments, the interconnect may be a point-to-point processor interconnect, and the protocol used to communicate over the interconnect may have any suitable characteristics of Intel Ultra Path Interconnect (UPI), Intel QuickPath Interconnect (QPI), or other known or future inter-processor communication protocol. In various embodiments, inter-processor communication controller 120 may be a UPI agent, QPI agent, or similar agent capable of managing inter-processor communications. In various embodiments, the same communication protocol used to communicate between processors 106 may be used for intra-processor communications, such as communications between home agents 116, communications between a caching agent 114 and a home agent 116, communications between a caching agent 114 and a fabric controller 122, or other communications.

In a particular embodiment, all of the processors 106 connected through a particular interconnect belong to the same coherent domain. In such embodiments, a caching agent 114 would send memory requests destined for home agents 116 of other processors 106 of the same node 102 through the inter-processor communication controller 120.

Fabric controller 122 provides an interface for inter-node communication. In particular embodiments, the fabric controller 122 may function as a proxy and make a remote node (e.g., 102B) appear to a processor (e.g., 106A) like a processor on the same node. For example, the fabric controller 122 may act as a home agent 116 for a remote memory device 108 That is, when a remote memory is to be accessed, the caching agent 114 may send a memory request to the fabric controller 122 using the same communication protocol that it would use to send a memory request to a home agent resident on the same processor 106A.

Fabric controller 122 may bridge between a communication protocol used by a processor 106 and a communication protocol used by the network fabric 104. In particular embodiments, this may include implementing the physical and link layers of the fabric architecture, such that a node can attach to the network fabric and send packets to and receive packets from other nodes. In various embodiments, fabric controller 122 may include specialized logic for executing or accelerating upper layer protocols. In particular embodiments, a fabric controller may also respond to messages from network management components.

In a particular embodiment, fabric controller 122 may receive prefetch requests generated by a processor 106A and send associated requests for data identified in the prefetch requests over the network fabric 104 to remote nodes. The fabric controller 122 may also receive data provided in response to such requests and store the data in a cache. In a particular embodiment, requests communicated across the network fabric 104 by the fabric controller 122 are transport layer requests (e.g., requests according to Layer 4 of the Open Systems Interconnection model).

In various embodiments, fabric controller 122 may include logic to communicate using any suitable physical layer and data link layer standard such as Ethernet (e.g., as defined by an IEEE 802.3 standard), Fibre Channel, Infiniband, Intel Omni-Path Host Fabric Interface (HFI), or other suitable standard. Fabric controller 122 may include or be coupled to one or more physical ports that may couple to a cable (e.g., an Ethernet cable, Infiniband cable, QSFP28 cable, or other suitable cable).

In various embodiments, fabric controller 122 may comprise a host bus adapter (e.g., an InfiniBand host channel adapter), a network interface controller (e.g., an Ethernet controller), an HFI adapter, or other suitable controller operable to manage communication between a processor 106 and network fabric 104.

In various embodiments, fabric controller 122 may be integrated on the same die or integrated circuit as processor 106. In other embodiments, fabric controller 122 may be located off of the die (e.g., on a chip or card insertable into a socket or slot of node 102). In various embodiments, a fabric controller 122 may be dedicated to a single processor 106 or shared among multiple processors 106 of the same node 102. In a particular embodiment, the fabric controller 122 may interface directly with other components of processor 106. In another embodiment, the fabric controller 122 may interface with components of processor 106 through an I/O controller, such as that described below.

Network fabric 104 may be any suitable network operating using one or more suitable networking protocols. Network fabric 104 may represent a series of interconnected communication paths for receiving and transmitting packets of information. In various embodiments, network fabric 104 may be a switched fabric which connects any number of fabric controllers 122 of various nodes 102 via one or more network switches (e.g., crossbar switches). In various embodiments, network fabric 104 may provide point-to-point connectivity between the fabric controllers 122.

Network fabric 104 may comprise any suitable network fabric, such as an Ethernet fabric, an Intel Omni-Path Fabric, an Intel True Scale Fabric, an InfiniBand-based fabric (e.g., Infiniband Enhanced Data Rate fabric), a RapidIO fabric, or other suitable network fabric. In other embodiments, network fabric 104 may comprise any other suitable board-to-board or chassis-to-chassis interconnect.

Although not depicted, in various embodiments, processor 106 may include or be coupled to one or more I/O controllers that include logic for communicating data between processor 106 and I/O devices, which may refer to any suitable devices capable of transferring data to and/or receiving data from an electronic system, such as a processor 106. For example, an I/O device may be a fabric controller 122; an audio/video (AN) device controller such as a graphics accelerator or audio controller; a data storage device controller, such as a flash memory device, magnetic storage disk, or optical storage disk controller; a wireless transceiver; a network processor; a network interface controller; or a controller for another input device such as a monitor, printer, mouse, keyboard, or scanner; or other suitable device.

An I/O device may communicate with an I/O controller of the processor 106 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In various embodiments, I/O devices coupled to the I/O controller may be located off-chip (i.e., not on the same integrated circuit or die as processor 106) or may be integrated on the same integrated circuit or die as the processor 106.

Although not depicted, system 100 may use a battery, renewable energy converter (e.g., solar power or motion-based energy), and/or power supply outlet connector and associated system to receive power, a display to output data provided by CPU 102, or a network interface allowing the CPU 102 to communicate over a network. In various embodiments, the battery, power supply outlet connector, display, and/or network interface may be communicatively coupled to CPU 102.

The components of a node 102 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, a Gunning transceiver logic (GTL) bus, or other type of interconnect.

Figure 2:
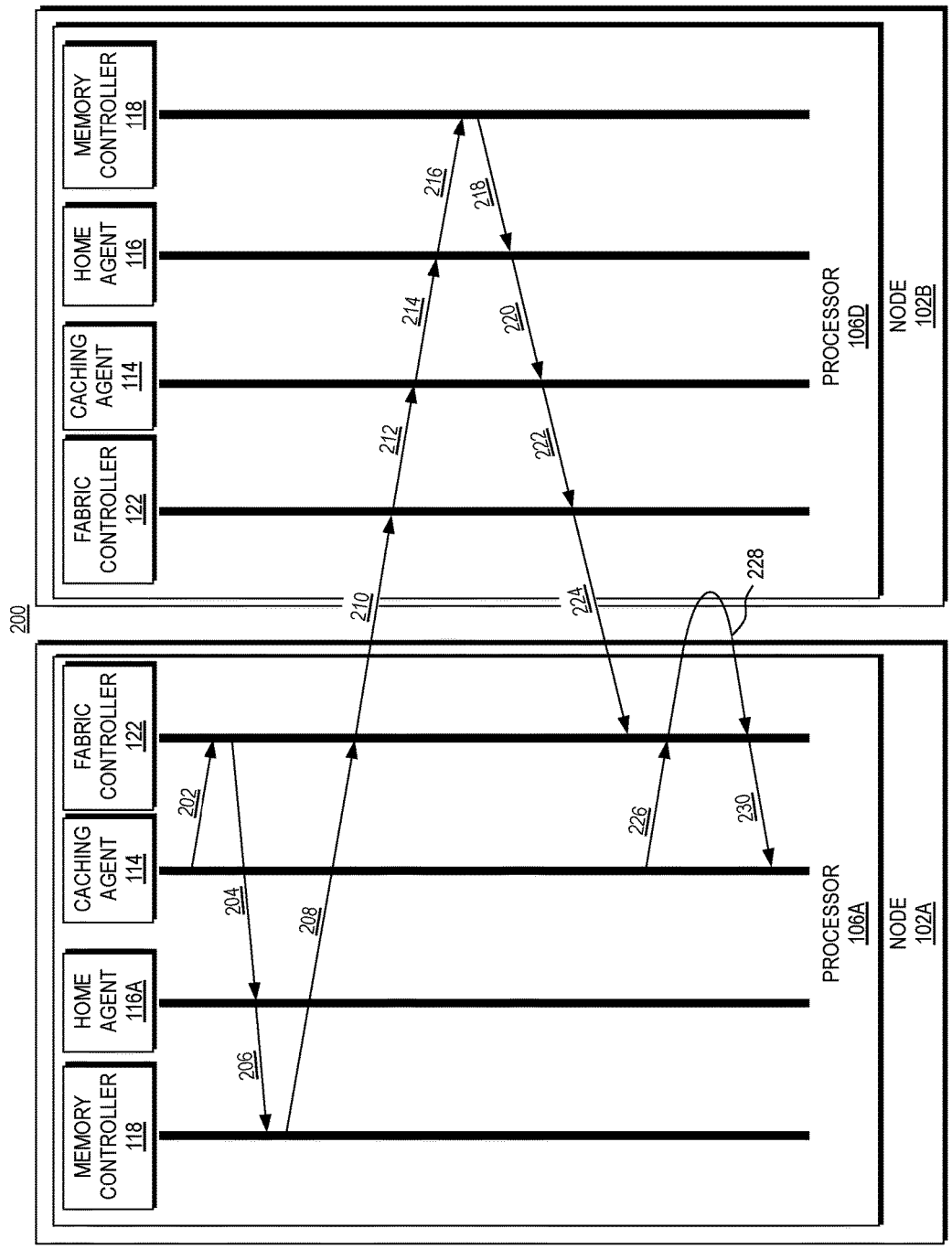
FIG. 2 illustrates an example flow for performing a remote prefetch of a first size in accordance with certain embodiments.

FIG. 2 illustrates an example flow 200 for performing a remote prefetch of a first size in accordance with certain embodiments. As an illustration, the size of the remote prefetch depicted in FIG. 2 may be set to the same size as the amount of data returned by a read request (e.g., a wordline of a memory device 108A). The flow 200 depicts example communications that may take place within computing system 100. The elements shown in the flow are examples only and in other embodiments, the remote prefetch could be performed through any other suitable communications. For example, as described in more detail below, the flow 200 depicts a flow utilizing a generic instruction interface where parameters of a prefetch request are stored in a memory device 108 and then retrieved by the fabric controller 122 when the fabric controller receives a generic instruction specifying a prefetch request. However, in other embodiments, the prefetch request may be generated and passed to the fabric controller 122 in any suitable manner.

A remote prefetch may be initiated by any suitable entity, such as an operating system or other software application executed by processor 106A, a fabric controller 122 (as one example, when multiple cores 110 are operating on data in round robin fashion but prefetching via the fabric controller 122, patterns may be visible at the fabric controller level that are not evident at the core level), or other suitable hardware or software entity. The remote prefetch may be used to bring data that is going to be used by a core 110 (or is likely to be used) closer to the core 110. A prefetch request may be distinguished from a read request in that the data accessed by the prefetch request is not immediately provided to a core (e.g., to be used in the processing of an instruction) in response to the prefetch request, but rather is stored (e.g., in a cache) for future use (e.g., the data may be provided when a read request for the data is received).

When a remote prefetch is initiated, a processor 106A may generate a prefetch request. The prefetch request identifies a group of data to be prefetched from a remote node. As an example, the prefetch request may specify one or more memory addresses (e.g., virtual memory addresses or physical memory addresses) associated with the data. For example, the prefetch request may specify a beginning address and/or an end address of the data to be prefetched. In various embodiments, if both the beginning address and the end address are specified, the group of data to be prefetched may include data that is addressable using the address space from the beginning address to the end address. As another example, the prefetch request may specify a size of the data to be prefetched. The size may be indicated in any suitable manner. For example, the size may be specified by an integer that represents the number of cells, bytes, wordlines, pages, blocks, or other unit of memory that should be prefetched. In a particular embodiment, the group of data to be prefetched by a prefetch request is specified by an address (e.g., a beginning address or an end address) and a size of the data to be prefetched. Any suitable size may be specified by the requesting entity and the size may be varied between successive prefetch requests by the same entity.

In a particular embodiment, a prefetch request includes an identifier of the remote node 102 that comprises the memory device 108 storing the data to be prefetched. In other embodiments, the prefetch request does not include an identifier of the remote node 102 and the processor 106 (e.g., by using address decoding logic of the caching agent 114, fabric controller 122, and/or other entity) routes the instruction to the proper remote node 102 based on an address of the group of data specified by the prefetch request.

In a particular embodiment, the prefetch request may include a bitmask or other data specifying portions of a group of data to be prefetched. For example, the prefetch request may identify a group of data in any suitable manner, such as the various embodiments described above. In addition, the prefetch request may include a bitmask in which each bit corresponds to a separate portion (e.g., a byte, a wordline, a page, etc.) of the group of data. If a bit is set (e.g., to a one), then that particular portion of the group of data is to be returned in response to the prefetch request. Thus, in one embodiment, a bitmask of "0101010101 . . . " may return every other wordline of a group of data specified by the prefetch request.

In various embodiments, the prefetch request may also include an indication of the priority of the data to be prefetched. In some embodiments, the priority may be set by the entity that issues the prefetch request (or other suitable entity) based on any suitable factor, such as how likely the data is to be used, how quickly the data is needed, or other suitable factor. The priority specified may be used by any suitable entity (e.g., remote node 102B or a component thereof, network fabric 104 or a component thereof, fabric controller 122, or other suitable entity) to determine the order in which memory requests are processed or to determine whether to cancel all or a portion of the prefetch request (a portion of the prefetch request may be performed by returning only a portion of the requested prefetch data). For example, if the remote node 102B and/or network fabric 104 are busy processing other memory requests (e.g., regular read or write requests), the prefetch request may be delayed and/or canceled in favor of the other memory requests. In a similar manner, the remote node 102B and/or network fabric 104 may delay or cancel all or a portion of the prefetch request based on an indication identifying that a request for data is associated with a prefetch request (e.g., regular read requests may be prioritized over read operations associated with a prefetch request).

Thus, in various embodiments, the fabric controller 122 of the remote node 102B may cancel a received request or may only provide a portion of requested data based on an indication that the request is associated with a prefetch request or a priority of the request. In such instances, the fabric controller 122 of the node 102A may notify the software stack (or other originating entity) of the failure using a software interrupt or the software stack may discover the failure through other mechanisms. If a prefetch fails, the software (or other originating entity) may try the prefetch again or may simply incur the latency penalty associated with a read over the network fabric when a regular read request is issued, but the functionality of the application is not affected.

At any point in the flow, one or more parameters of the prefetch request may be modified. For example, at any suitable entity (e.g., a caching agent 114, home agent 116, fabric controller 122, or other component of a processor 106 or a node 102), a virtual memory address specified by the prefetch request may be translated to a physical memory address or information aiding the routing of the prefetch request may be added to the prefetch request. As another example, the prefetch request may be translated by the fabric controller 122 into one or more requests compatible with the network fabric 104.

In one embodiment, prior to the flow shown in FIG. 2, a software application executed by processor 106A may initiate a remote prefetch by requesting a prefetch and supplying one or more parameters for the prefetch request. In one embodiment, the parameters for the prefetch request may written to memory device 108A or other memory of the processor 106A. In response to the request by the software application, the processor 106A may generate a prefetch request. In one embodiment, the prefetch request is placed in a request queue 112 and then passed to a caching agent 114.

Referring to flow 200 of FIG. 2, at 202, the caching agent 114 may determine that the prefetch request is destined for a remote node 102B and may pass the prefetch request to the fabric controller 122. The caching agent 114 may determine that the prefetch request is destined for a remote node in any suitable manner. For example, the caching agent may determine that the instruction is a prefetch request (e.g., based on the structure and/or data included within the request), that the prefetch request refers to a memory address that is located on a remote node 102B, or that the prefetch request specifies an identifier of a remote node 102B.

In the embodiment depicted, a generic command interface is used wherein the prefetch request sent from the caching agent 114 to the fabric controller 122 at 202 does not include all of the prefetch request parameters (e.g., memory address (es), size, remote node identifier, priority, bitmask, and/or other parameters). Rather, the generic prefetch request command may include one or more pointers (e.g., memory addresses of memory device 108A) to prefetch request parameters that are stored in a memory accessible by processor 106. This generic command may be passed to the caching agent 114 and then sent (at 202) to fabric controller 122. In response to receiving the generic prefetch request command, at 204 and 206 the fabric controller 122 requests the parameters of the command from a memory device (e.g., 108A) via home agent 116A and the home agent 116A retrieves the parameters from the memory device (e.g., via a memory controller 118). These parameters are then sent to the fabric controller at 208.

In various embodiments, the generic command interface may allow for descriptions of commands to be placed in firmware, thus allowing customizable instructions that may be rewritten according to processor needs. In such embodiments, when an entity of the processor (e.g., a home agent 116 or fabric controller 122) receives a generic command, it can read a description of the command from a memory (e.g., a memory device 108 or other memory of the processor). Such embodiments may allow the use of any number of commands without extending the number of messages supported by a protocol used to send memory (or other) requests within a processor 106. Although a flow using a generic command interface is depicted, any suitable flow for generating a prefetch request by the processor 106A and passing the prefetch request to fabric controller 122 may be used.

At 210, fabric controller 122 sends a request for the prefetch data. The request may include any one or more of the parameters of the prefetch request described above, parameters derived therefrom, or other suitable parameters enabling identification of the data to be prefetched. In particular embodiments, the fabric controller 122 formats the request for the prefetch data according to a message syntax compatible with the network fabric. For example, the fabric controller 122 may receive the prefetch request in a format compliant with a protocol (e.g., Intel's In-die Interface (IDI) used to transfer memory requests within a processor and convert the prefetch request into a format compliant with a protocol used by the network fabric (e.g., an HFI get command). In various embodiments, the request sent at 210 may have the same format as a request that would be sent when performing a normal read request from a remote node. In some embodiments, the request sent over the fabric may include an indication that the request is associated with a prefetch request (e.g., a bit indicating whether the request is a prefetch request may be included in the request), an indication of the priority of the request, and/or a bitmask specifying portions of the data that should be returned. In various embodiments, one or more addresses of the request sent at 210 may be virtual addresses or physical addresses of the requested data.

When the fabric controller 122 of the processor (e.g., 106D) of the remote node 102B coupled to the destination memory device (e.g., 108F) receives the request sent at 210, it may convert the request into a format compliant with a protocol used by processor 106D of the remote node 102B (which may or may not be the same format as the format used by processor 106A). In various embodiments, the converted request may include any suitable combination of the information included in the prefetch request. In particular embodiments, an identification of the remote node 102B may be omitted from the converted request as it would no longer be needed to route the request. In various embodiments, an indication that the converted request is a prefetch request and/or a priority of the request is omitted as the fabric controller 122 of the processor 106D may extract this information for use in determining whether to process the request and it may not need to be passed to other components of the processor 106D (though if any downstream entities are capable of using such information in determining whether to process the request it may be included).

At 212, the request is sent to the caching agent 114 which then sends the request (at 214) to the home agent 116 associated with the memory device (e.g., 108F) that stores data addressable by the memory address(es) specified by the request. The data is requested (e.g., via a memory controller 118) and received at 216 and 218 and then passed to caching agent 114 at 220 and then to the fabric controller 122 at 222. The fabric controller 122 of processor 106D may then format the data in accordance with a format specified by a protocol used by the network fabric 104 and send the data to the fabric controller 122 of processor 106A at 224. The data is then cached at node 102A. The cache used to store the prefetched data may comprise any suitable memory of node 102A, such as a cache of the fabric controller 122, a cache of the processor 106A, a portion of memory device 108A, a cache of the node 102A that may be shared by multiple processors 106, or other suitable memory location. As used herein, a cache may refer to a memory that stores a copy of a group of data in order to speed up the processing of requests for the data relative to retrieving the data from its source.

After some time passes, a core 110 may process an instruction that specifies the use of at least a portion of the data that was prefetched from node 102B and cached at node 102A. A read request may be propagated to the caching agent 114 which determines that an address of the data requested corresponds to data available through the fabric controller 122 (e.g., the caching agent 114 may determine that the source of the data is a remote node 102B reachable through the fabric controller 122). The request is then passed to the fabric controller 122 at 226. The fabric controller 122 discovers that the requested data has been prefetched and thus is available at node 102A. The fabric controller 122 retrieves the data at 228 (e.g., from a cache of the fabric controller or from other cache of node 102A) and passes the data to the caching agent 230 which may make the data available to the requesting core. As explained earlier, since the size of the prefetched data in flow 200 of FIG. 2 is the same as the size of a read request, only a single read operation is used to obtain the prefetched data.

Thus, when a read request for the prefetched data is processed, the data may be sent to the requesting entity much more quickly than if the data had not been prefetched (as such data would be requested over the network fabric 104, resulting in substantial delay).

The flow described in FIG. 2 is merely representative of operations or communications that may occur in particular embodiments. In other embodiments, additional operations may be performed or additional communications sent among the components of system 100. Various embodiments of the present disclosure contemplate any suitable signaling mechanisms for accomplishing the functions described herein. Some of the operations illustrated in FIG. 2 may be repeated, combined, modified or deleted where appropriate. Additionally, operations may be performed in any suitable order without departing from the scope of particular embodiments.

Figure 3:
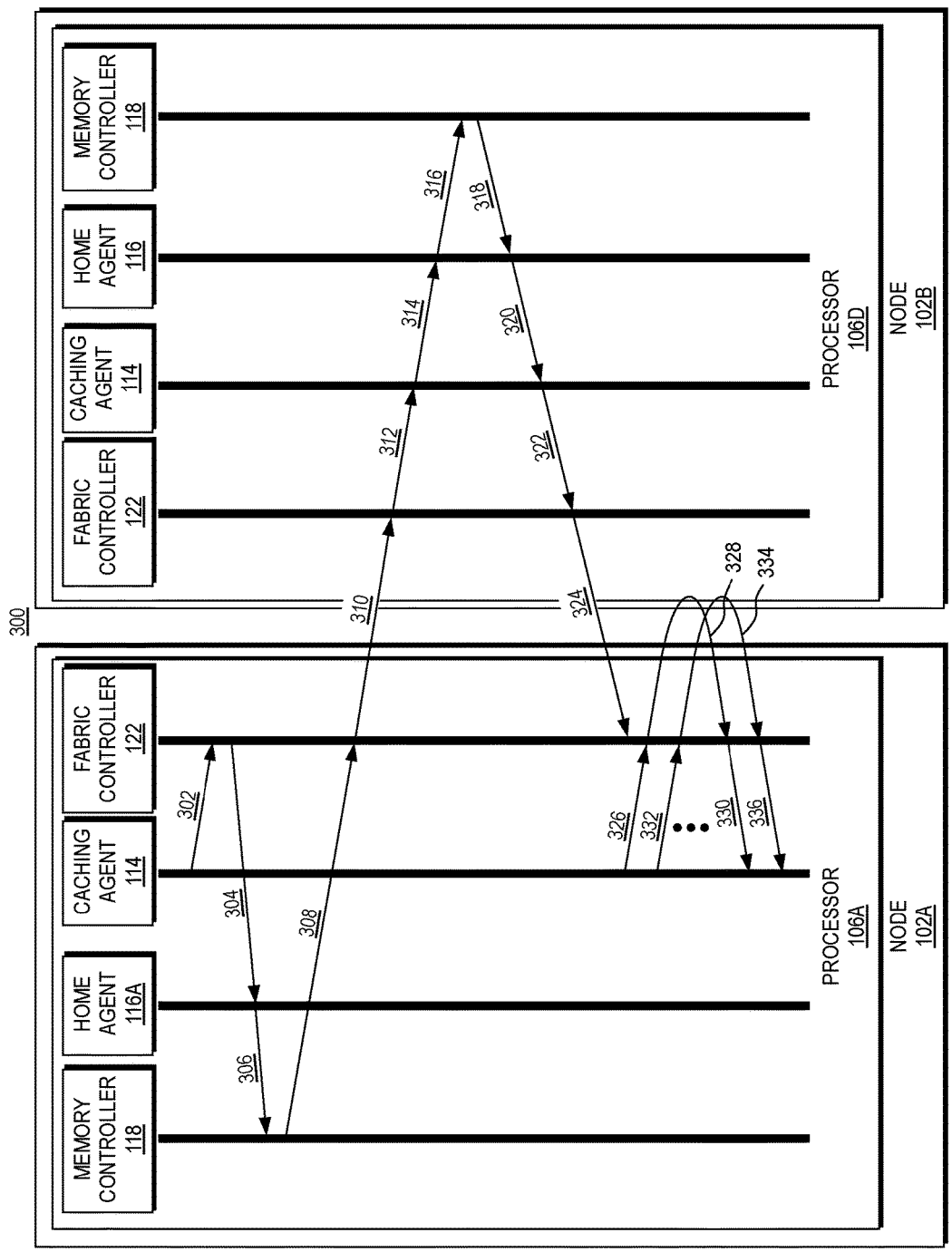
FIG. 3 illustrates an example flow for performing a remote prefetch of a second size in accordance with certain embodiments.

FIG. 3 illustrates an example flow 300 for performing a remote prefetch of a second size in accordance with certain embodiments. The flow of 300 is similar to flow 200, but the size of the remote prefetch depicted in flow 300 is larger than the size of the remote prefetch depicted in flow 200. For example, the size of the remote prefetch depicted in flow 300 is larger than the size of a standard read request. The flow 300 proceeds in the same manner as flow 200, but the size of the prefetch data indicated by the request made at 310 and the amount of data returned at 324 is larger than in the corresponding communications of flow 200.

In flow 200, the data size of the prefetch request was small enough that a single read request resulted in all of the prefetched data being sent to the requesting core. In flow 300, the prefetched data size is larger than the amount of data sought by a read request. Accordingly, multiple read requests are performed in order to retrieve all of the prefetched data. Thus at 326, a read request for a portion of the prefetched data (e.g., a wordline) is sent from the caching agent 114 to fabric controller 122. At 328, the fabric controller 122 retrieves the data from a cache and then passes the data to the caching agent at 330. The data is then sent to the requesting entity (e.g., a core 110). At 332, another read request for another portion of the prefetched data is sent from the caching agent 114 to fabric controller 122. At 334, the fabric controller 122 retrieves the data from the cache and then passes the data to the caching agent at 336 to send to the requesting entity. Any number of read requests for the prefetched data may be performed.

The flow described in FIG. 3 is merely representative of operations or communications that may occur in particular embodiments. In other embodiments, additional operations may be performed or additional communications sent among the components of system 100. Various embodiments of the present disclosure contemplate any suitable signaling mechanisms for accomplishing the functions described herein. Some of the operations illustrated in FIG. 3 may be repeated, combined, modified or deleted where appropriate. Additionally, operations may be performed in any suitable order without departing from the scope of particular embodiments.

Figure 4:
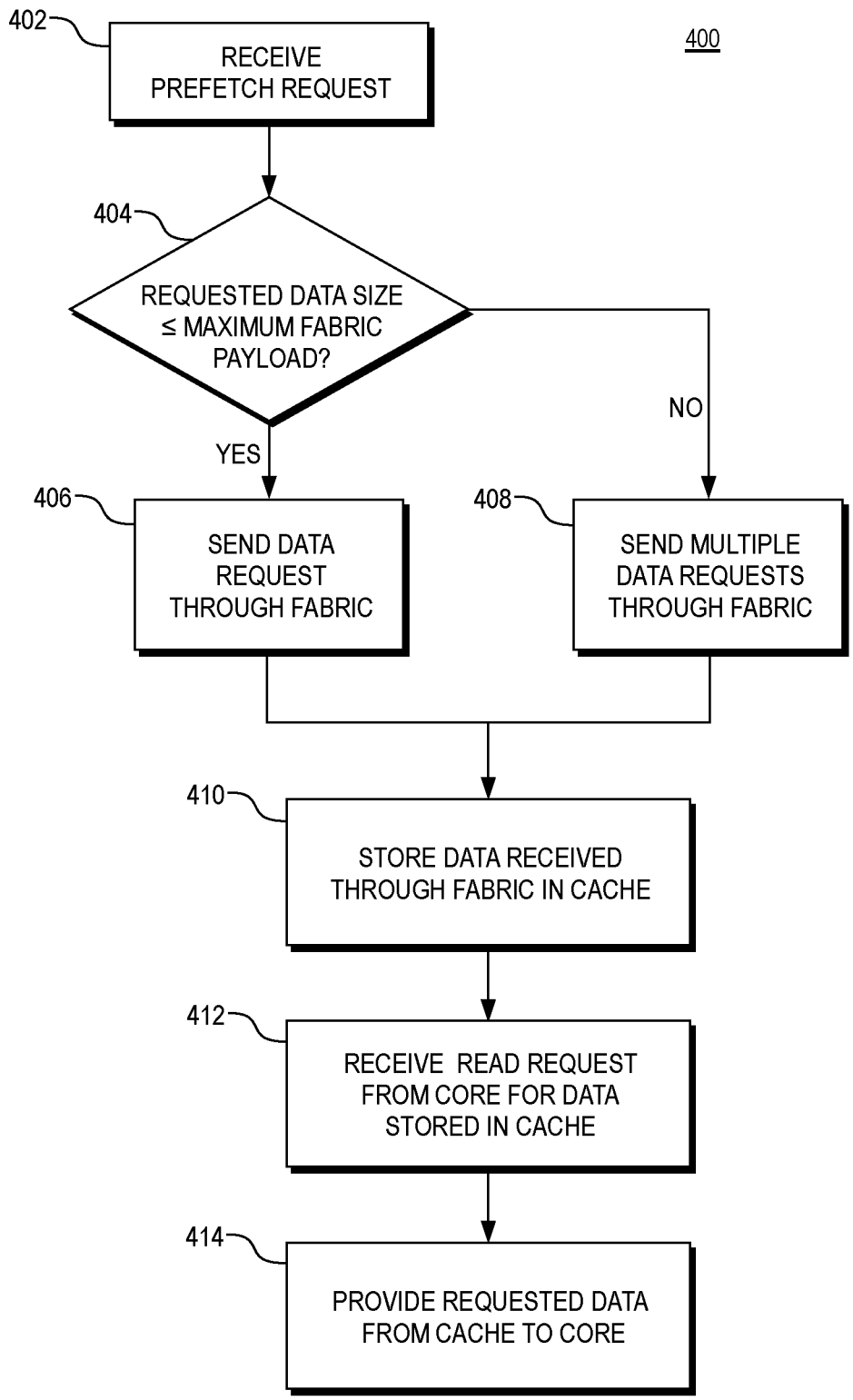
FIG. 4 illustrates an example method for performing a remote prefetch in accordance with certain embodiments.

FIG. 4 illustrates an example method 400 for performing a remote prefetch in accordance with certain embodiments. In various embodiments, the method 400 may be performed by a fabric controller 122 or other suitable logic of a computing node 102. At 402, a prefetch request is received. At 404, a requested data size of the prefetch instruction is determined and compared against a maximum payload size of the network fabric 104. The data size may be determined in any suitable manner based on one or more parameters specified in the prefetch request. In some embodiments, the data size is explicitly indicated in the prefetch request. In other embodiments, the data size may be derived from other parameters of the prefetch request (e.g., the data size may be based on the difference between a start address and an end address of the requested data).

If the requested data size is equal to or smaller than the maximum fabric payload size, a request for the data identified by the prefetch request is sent through the network fabric 104 at 406. If the requested data size is larger than the maximum fabric payload, then multiple data requests are sent through the network fabric at 408. The multiple requests may collectively request the data identified by the prefetch request. In a particular embodiment, at least some of the data requests sent through the fabric at 408 may request an amount of data equal to the maximum fabric payload (e.g., the maximum amount of data that may be returned in response to a data request).

In an alternative embodiment, if the requested data size of the prefetch request is larger than the maximum fabric payload, the prefetch request is not performed. In some embodiments, the requesting entity may be notified of the failure. In yet another alternative embodiment, if the requested data size of the prefetch request if larger than the maximum fabric payload, the request may be truncated. For example, only a portion of the data requested by the prefetch request may be requested over the network fabric 104. For example, an amount of data that is equal to the maximum payload size may be requested over the fabric and the remainder of the prefetch request is canceled (i.e., the remaining data identified in the prefetch request is not requested over the fabric).

At 410, data is received through the network fabric 104 in response to the data request(s) sent through the fabric and stored in a cache. At 412, a read request is received from a core for data stored in the cache and at 414 the requested data is provided from the cache to the requesting core.

The flow described in FIG. 4 is merely representative of operations and communications that may occur in particular embodiments. In other embodiments, additional operations may be performed or additional communications sent among the components of system 100. Various embodiments of the present disclosure contemplate any suitable signaling mechanisms for accomplishing the functions described herein. Some of the operations illustrated in FIG. 4 may be repeated, combined, modified or deleted where appropriate. Additionally, operations may be performed in any suitable order without departing from the scope of particular embodiments.

Figure 5:
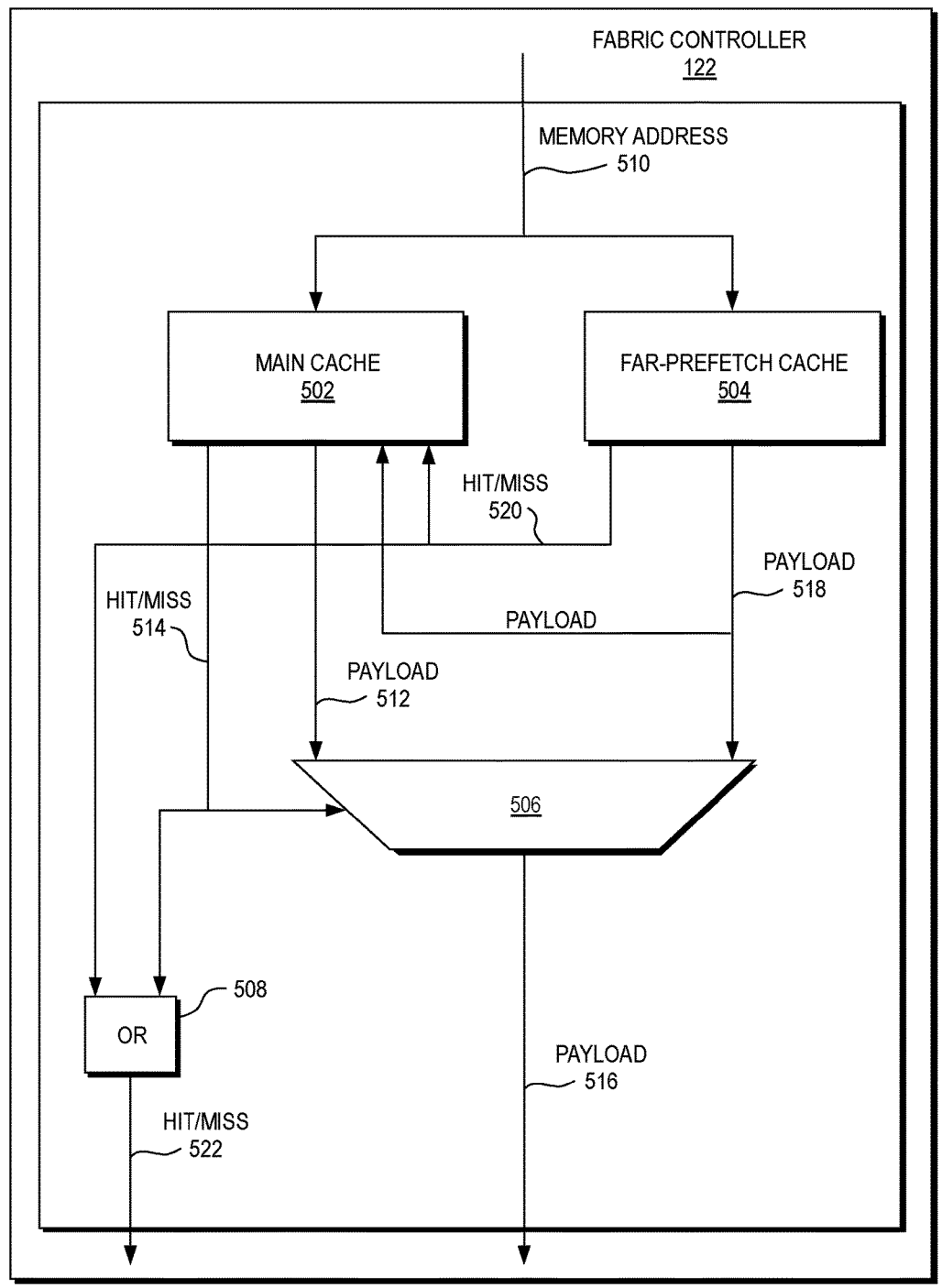
FIG. 5 illustrates a portion of an example fabric controller for providing cached prefetched data in accordance with certain embodiments.

FIG. 5 illustrates a portion of an example fabric controller 122 for providing cached prefetched data in accordance with certain embodiments. Fabric controller 122 includes a main cache 502, a far-prefetch cache 504, multiplexing logic 506, and an OR gate 508. The main cache 502 of the example fabric controller 122 may be used to store data that has been requested via a normal read request (which could be obtained by reading the data from a remote node or from reading the data from the far-prefetch cache 504 if the data was previously prefetched) or data that has been requested by a remote node (and that will be provided by the fabric controller 122) while the far-prefetch cache stores only data prefetched from a remote memory device 108. Such embodiments may avoid cache pollution (e.g., cache pollution may involve removing, from a cache, useful data that is likely to be used again soon in order to include data that won't be used relatively soon, such as prefetched data) caused by prefetching operations. In other embodiments, a single cache of the fabric controller 122 may store data requested via a read request, data to be provided to a remote node, and prefetched data.

A read request may be received at the fabric controller 122. A memory address 510 of the read request may be (e.g., simultaneously) provided to the main cache 502 and the far-prefetch cache 504. Each cache outputs a hit/miss value (514 and 520) indicating whether the cache includes data associated with the address (e.g., a copy of the data stored at a location of a memory device 108 that is identified by the address or a corresponding physical address if the provided address is a virtual address).

If the data is found to be located in the far-prefetch cache 504 (as indicated by the hit/miss signal 520), then the data (i.e., payload 518) is provided through multiplexing logic 506 to output 516 and the data is also copied into the main cache 502 and removed from the far-prefetch cache 504 (so that the next time the data is read there will be no hit in the far-prefetch cache 504 and the memory space previously occupied by the data can be opened up for additional prefetch data). If the data is found to be located in the main cache 502, then the data is provided to the output 516 via the multiplexing logic 506. An indication of whether the data was found in either cache (i.e., whether the payload is a valid output) may also be provided by ORing the hit/miss signals 514 and 520 from both caches to produce output signal 522.

Figure 6:
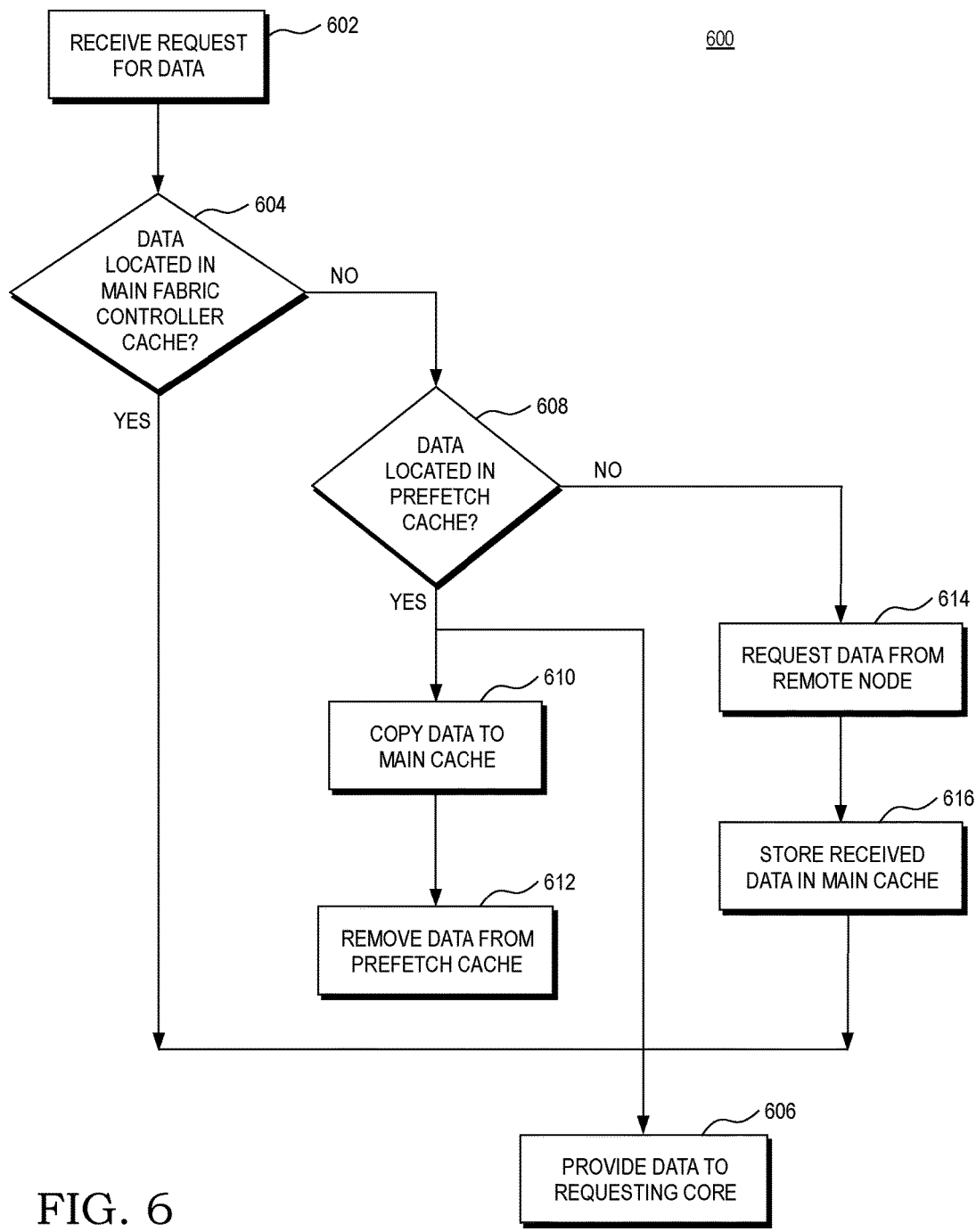
FIG. 6 illustrates an example method for providing requested data in accordance with certain embodiments.

FIG. 6 illustrates an example method 600 for providing requested data in accordance with certain embodiments. The various operations of flow 600 may be performed by any suitable logic of node 102, such as a fabric controller 122. At 602, a request for data is received. At 604 it is determined whether the data is located in the main fabric controller cache. If the data is located in the main fabric controller cache, the data may be provided to the requesting core at 606. If the data is not located in the main fabric controller cache, it may be determined whether the data is located in the prefetch cache of the fabric controller 122 (or other memory location of the node 102) at 608. In some embodiments, 604 and 608 may be performed simultaneously.

If the requested data is located in the prefetch cache, the data may be copied to the main cache at 610 and then removed from the prefetch cache at 612. If the requested data is not located in the prefetch cache, the data may be requested over the network fabric 104 from the remote node where the data is stored at 614. When the data is received, it is stored in the main cache at 616 and provided to the requesting core at 606.

The flow described in FIG. 6 is merely representative of operations and communications that may occur in particular embodiments. In other embodiments, additional operations may be performed or additional communications sent among the components of system 100. Various embodiments of the present disclosure contemplate any suitable signaling mechanisms for accomplishing the functions described herein. Some of the operations illustrated in FIG. 6 may be repeated, combined, modified or deleted where appropriate. Additionally, operations may be performed in any suitable order without departing from the scope of particular embodiments.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the functionality of the various components such as network fabric 104, processor 106, memory device 108, core 110, request queue 112, caching agent 114, home agent 116, memory controller 118, inter-processor communication controller 120, fabric controller 122, or other entity described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

In at least one embodiment, an apparatus comprises a processor to generate, in anticipation of receipt of a read request for data of a data set, a prefetch request to retrieve the data set from a memory device, the prefetch request to comprise at least one parameter indicating a size of the data set; cause transmission of the prefetch request to the memory device; and in response to a read request for at least a portion of the data set, request the at least a portion of the data set from a cache storing a copy of the data set, wherein the cache is to store the copy of the data set after the copy is received from the memory device in response to the prefetch request.

In at least one embodiment, the prefetch request comprises an address associated with the data set. In at least one embodiment, the prefetch request comprises a priority of the prefetch request. In at least one embodiment, the prefetch request comprises a bitmask to specify which portions of a group of data specified by the prefetch request form the data set that should be prefetched. In at least one embodiment, the processor comprises the cache. In at least one embodiment, the processor comprises a fabric controller to provide a communication interface between the processor and a network fabric coupled between the processor and the memory device. In at least one embodiment, the cache comprises a prefetch cache of the fabric controller, the prefetch cache dedicated to storing prefetched data, and wherein the fabric controller also comprises an additional cache that is distinct from the prefetch cache. In at least one embodiment, the network fabric comprises at least one switch. In at least one embodiment, the fabric controller is to determine whether a size of the data set is larger than an allowable payload size of the network fabric. In at least one embodiment, the fabric controller is to generate a plurality of data requests compliant with the network fabric in response to a determination that the size of the data set is larger than the allowable payload size of the network fabric.

In at least one embodiment, a method comprises generating, in anticipation of receiving a read request for data of a data set, a prefetch request to retrieve the data set from a memory device, the prefetch request to comprise at least one parameter indicating a size of the data set; causing transmission of the prefetch request to the memory device; and in response to a read request for at least a portion of the data set, requesting the at least a portion of the data set from a cache storing a copy of the data set, wherein the cache is to store the copy of the data set after the copy is received from the memory device in response to the prefetch request. In at least one embodiment, the prefetch request comprises an address associated with the data set. In at least one embodiment, the prefetch request comprises a priority of the prefetch request. In at least one embodiment, the prefetch request comprises a bitmask specifying which portions of a group of data specified by the prefetch request form the data set that should be prefetched. In at least one embodiment, the method further comprises generating a plurality of data requests compliant with a network fabric in response to a determination that the size of the data set is larger than the allowable payload size of the network fabric. In at least one embodiment, the network fabric comprises at least one switch. In at least one embodiment, the cache is a prefetch cache of a fabric controller, the prefetch cache dedicated to storing prefetched data, and wherein the fabric controller also comprises an additional cache that is distinct from the prefetch cache. In at least one embodiment, the method further comprises determining whether a size of the data set is larger than an allowable payload size of a network fabric. In at least one embodiment, the method further comprises generating a plurality of data requests compliant with a network fabric in response to a determination that the size of the data set is larger than an allowable payload size of the network fabric.

In at least one embodiment, a system comprises a first fabric controller to receive a prefetch request to retrieve a data set from a memory device, the prefetch request to comprise at least one parameter indicating a size of the data set; send a request for the data set over a network fabric to a second fabric controller; receive the data set from the second fabric controller over the network fabric and store the data set in a cache; and in response to receipt of a read request for at least a portion of the data set, provide the at least a portion of the data set from the cache.

In at least one embodiment, the system further comprises a processor to generate the prefetch request and the read request. In at least one embodiment, the system further comprises a first processor comprising the first fabric controller. In at least one embodiment, the system further comprises a first computing node comprising the first processor and at least one other processor; a second computing node comprising the memory device and at least one processor; and the network fabric coupling the first computing node to the second computing node. In at least one embodiment, the system further comprises one or more of: a battery communicatively coupled to the processor; a display communicatively coupled to the processor; or a network interface communicatively coupled to the processor.

In at least one embodiment, a system comprises means for generating, in anticipation of receipt of a read request for data of a data set, a prefetch request to retrieve the data set from a memory device, the prefetch request to comprise at least one parameter indicating a size of the data set; means for causing the transmission of the prefetch request to the memory device; and means for requesting the at least a portion of the data set from a cache storing a copy of the data set in response to a read request for at least a portion of the data set, wherein the cache is to store the copy of the data set after the copy is received from the memory device in response to the prefetch request. In at least one embodiment, the prefetch request comprises an address associated with the data set. In at least one embodiment, the prefetch request comprises a priority of the prefetch request. In at least one embodiment, the prefetch request comprises a bitmask to specify which portions of a group of data specified by the prefetch request form the data set that should be prefetched. In at least one embodiment, the system further comprises means for generating a plurality of data requests compliant with a network fabric in response to a determination that the size of the data set is larger than the allowable payload size of the network fabric.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a processor to:
      generate, in anticipation of receipt of a read request for data of a data set, a prefetch request to retrieve the data set from a memory device, the prefetch request to comprise at least one parameter indicating a size of the data set;
      responsive to the prefetch request, cause transmission of a data request to a remote computing node associated with the memory device, wherein the data request is sent by a fabric controller over a network fabric coupling the processor to the remote computing node and comprises an indication of at least a portion of the data set and an indication of priority of the data request; and
      in response to a read request for at least a portion of the data set, request the at least a portion of the data set from a cache storing a copy of the data set, wherein the cache is to store the copy of the data set after the copy is received from the memory device in response to the prefetch request.

2. The apparatus of claim 1, wherein the prefetch request comprises an address associated with the data set.

3. The apparatus of claim 1, wherein the prefetch request comprises a priority of the prefetch request.

4. The apparatus of claim 1, wherein the prefetch request comprises a bitmask to specify which portions of a group of data specified by the prefetch request form the data set that should be prefetched.

5. The apparatus of claim 1, wherein the processor comprises the cache.

6. The apparatus of claim 1, wherein the processor comprises the fabric controller, the fabric controller to provide a communication interface between the processor and a network fabric coupled between the processor and the memory device.

7. The apparatus of claim 6, wherein the cache comprises a prefetch cache of the fabric controller, the prefetch cache dedicated to storing prefetched data, and wherein the fabric controller also comprises an additional cache that is distinct from the prefetch cache.

8. The apparatus of claim 6, wherein the network fabric comprises at least one switch.

9. The apparatus of claim 6, wherein the fabric controller is to determine whether a size of the data set is larger than an allowable payload size of the network fabric.

10. The apparatus of claim 9, wherein the fabric controller is to generate a plurality of data requests compliant with the network fabric in response to a determination that the size of the data set is larger than the allowable payload size of the network fabric.

11. The apparatus of claim 1, wherein the indication of priority of the data request indicates that the data request is associated with a request to prefetch data.

12. The apparatus of claim 7, wherein the prefetch cache and the additional cache are both checked in response to the read request for at least the portion of the data set.

13. A method comprising:
    generating, in anticipation of receiving a read request for data of a data set, a prefetch request to retrieve the data set from a memory device, the prefetch request to comprise at least one parameter indicating a size of the data set;
    responsive to the prefetch request, causing transmission of a data request to a remote computing node associated with the memory device, wherein the data request is sent by a fabric controller over a network fabric coupling a processor to the remote computing node and comprises an indication of at least a portion of the data set and an indication of priority of the data request; and
    in response to a read request for at least a portion of the data set, requesting the at least a portion of the data set from a cache storing a copy of the data set, wherein the cache is to store the copy of the data set after the copy is received from the memory device in response to the prefetch request.

14. The method of claim 13, wherein the prefetch request comprises an address associated with the data set.

15. The method of claim 13, wherein the prefetch request comprises a priority of the prefetch request.

16. The method of claim 13, wherein the prefetch request comprises a bitmask specifying which portions of a group of data specified by the prefetch request form the data set that should be prefetched.

17. The method of claim 13, further comprising generating, by the fabric controller, a plurality of data requests compliant with a network fabric in response to a determination that the size of the data set is larger than an allowable payload size of the network fabric.

18. A system comprising:
    a first fabric controller to:
       receive a prefetch request to retrieve a data set from a memory device, the prefetch request to comprise at least one parameter indicating a size of the data set;
       responsive to the prefetch request, send a request for the data set over a network fabric to a second fabric controller, wherein the request comprises an indication of priority of the request;
       receive the data set from the second fabric controller over the network fabric and store the data set in a cache; and
       in response to receipt of a read request for at least a portion of the data set, provide the at least a portion of the data set from the cache.

19. The system of claim 18, the system further comprising a processor to generate the prefetch request and the read request.

20. The system of claim 18, the system comprising a first processor comprising the first fabric controller.

21. The system of claim 20, the system comprising:
    a first computing node comprising the first processor and at least one other processor;
    a second computing node comprising the memory device and at least one processor; and the network fabric coupling the first computing node to the second computing node.

22. The system of claim 19, further comprising one or more of:
a battery communicatively coupled to the processor;
a display communicatively coupled to the processor; or
a network interface communicatively coupled to the processor.

* * * * *